INVENTOR.
WYMAN C. RUTLEDGE

Sept. 28, 1965  W. C. RUTLEDGE  3,208,265
ERASABILITY TESTER
Filed Nov. 23, 1962  6 Sheets-Sheet 3

INVENTOR.
WYMAN C. RUTLEDGE
BY

INVENTOR.
WYMAN C. RUTLEDGE

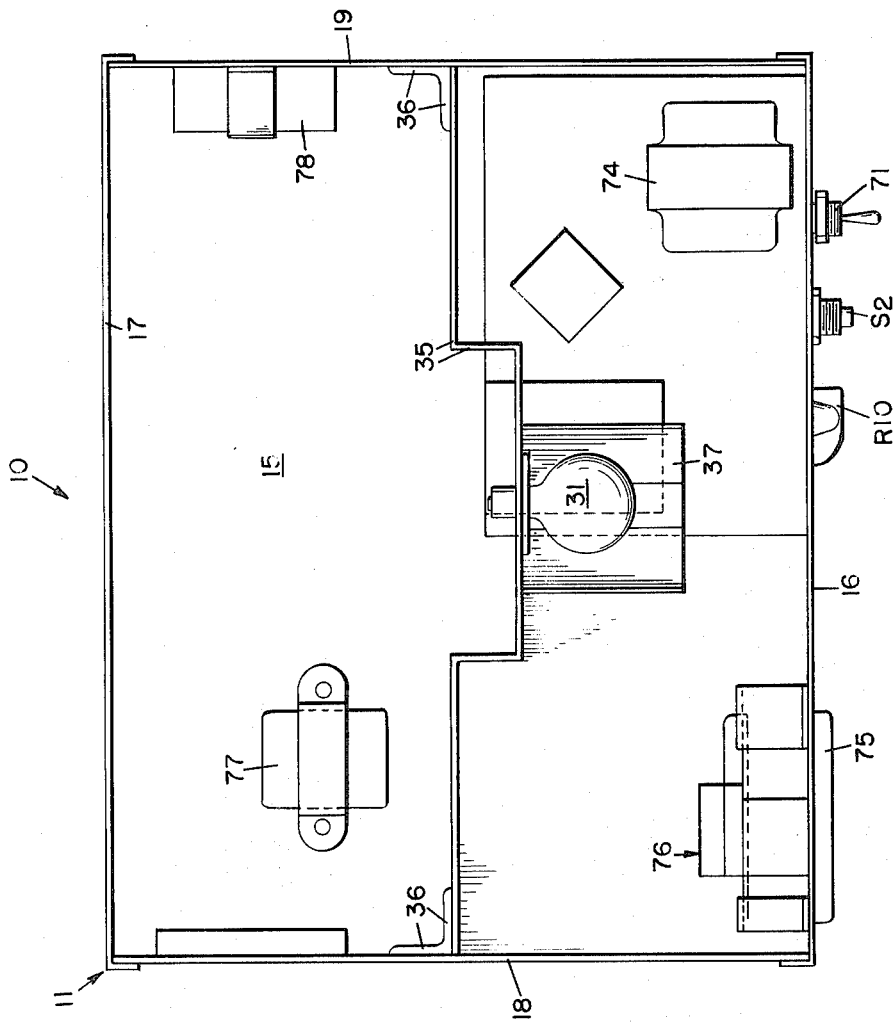

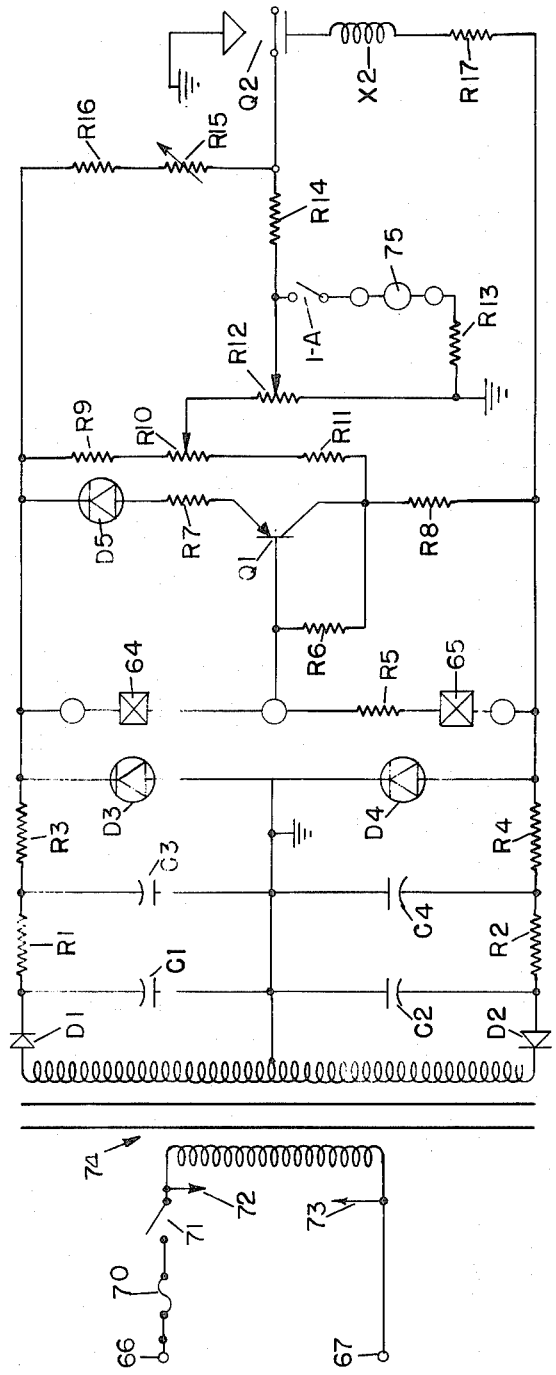

United States Patent Office 3,208,265
Patented Sept. 28, 1965

3,208,265
ERASABILITY TESTER
Wyman C. Rutledge, Chillicothe, Ohio, assignor to The Mead Corporation, Dayton, Ohio, a corporation of Ohio
Filed Nov. 23, 1962, Ser. No. 239,676
8 Claims. (Cl. 73—7)

This invention relates to an improved erasability tester.

Generally, there is provided a table supportable cabinet or housing within which are mounted a synchronous electric motor for driving the erasing mechanism and the components of electric and electronic controls and circuits for the apparatus. A horizontally disposed paper-holding platen is fixed on the top panel of the cabinet toward the front thereof. The platen is provided with a plurality of peripherally disposed apertures connected to a source of vacuum for gripping and holding the margins of a sheet of paper being tested.

A large opening in the center of the platen is covered by a frosted glass plate positioned to underlie the test area of a sheet of paper. The glass plate is evenly illuminated from below by a lens and a point light source located at the focus of the lens.

A horizontally reciprocating carriage is mounted on the cabinet top behind the platen and is driven at constant speed by the synchronous motor. A horizontally disposed tester arm is vertically swingably attached to the carriage and its free end extends medially over the platen for longitudinal reciprocation of said free end over the illuminated glass plate centrally thereof.

A vertically disposed rod-shaped eraser is axially adjustably held in a coaxial sleeve rotatably mounted in a vertical bore in the free end of the test arm, the weight of which presses the eraser against the test sheet of paper with constant pressure. The coaxial sleeve has a ratchet wheel formed on its lower end for engagement with a fixed spring finger at the end of each return stroke to constantly rotate the eraser for producing even wear thereof and for facilitating removal of debris by a vacuum-type collection tube terminating close to the test area.

A pair of photosensitive elements is carried by the free end of the test arm and positioned so that one thereof is moved back and forth during each cycle of operation over the test area being abraded and worn away by the eraser, while the other element is constantly held over an adjacent illuminated area unaffected by the eraser and thus serving as a control area. The two photosensitive elements are connected in an electronic circuit balancing their electrical characteristics against each other so that a pulsating and progressively increasing signal is obtained as the test paper is worn away.

When the signal reaches an adjustably predetermined imbalance value, a relay is tripped and the apparatus is stopped. A timer, connected in the circuit controlled by the relay, gives a numerical reading of the time required for producing the predetermined amount of reduction in opacity of the test sheet, that is, its resistance to abrasion by the eraser used. This numerical value is inversely proportional to the erasability of the paper.

Erasability tests of the prior art have had many serious deficiencies. One tester employed a rubber eraser rubbed back and forth over typed characters until they were "removed." Its results were not reproducible, particularly with different operators; and each determination, or rather interpretation, of complete erasure was largely a matter of personal judgment. The test was also unreliable from the mechanical viewpoint; pressure on the eraser was neither positive nor constant; since there was no means for cleaning the eraser or removing debris, the eraser tended to skin over and balls of spent eraser further prevented effective abrasion; and it was found to be difficult to place the test samples in the correct position for aligning the eraser and the marks on the paper. And, finally, the test was too slow, taking from one to thirty minutes.

In other testers, an inked line was erased by an abrading wheel, which wore unevenly to produce unreliable readings. Changes in optical reflectivity and low angle gloss were also used to form the basis for a measurement; however, when a paper sheet is erased, the gloss increases for some papers and decreases for others.

It is, accordingly, an object of the present invention to provide a simple, fully automatic and reliable erasibility tester which measures the time required to abrade away under constant conditions a part of the thickness of the paper as a measure of its erasability.

It is another object of the invention to provide a device of the character described in which the rate of wearing away is measured by a pair of light sensitive elements, one intermittently sensing the light-transmissivity of the area being abraded and the other exposed over an adjacent unaffected control area, the elements being connected in an initially balanced circuit adjusted to provide a reading when a preselected degree of signal imbalance results from the erasing action on the test area.

It is a further object of the invention to provide a device of the character set forth in which a numerical or digital reading is produced, as by a simple timer deenergized by a relay tripped by a predetermined imbalance in the initially balanced photosensitive circuits.

It is another object of the present invention to provide an erasibility tester having means, such as a vacuum line, for removing debris from the test zone.

It is a still further object of the invention to provide automatic means for rotating the eraser of such a device so as to insure even wear thereof and to render the same self-cleaning.

Another object of the invention is to provide a simple and effective vacuum holder and positioner for the test sheet of paper.

Other and further objects of the invention will become apparent from a reading of the following specification taken in conjunction with the drawings, in which:

FIGURE 5 is a plan view of the showing of FIGURE 4;

FIGURE 6 is a wiring diagram of the electronic sensing and control circuit;

FIGURE 7 is a wiring diagram of the motor and timer control circuit;

Figure 1:
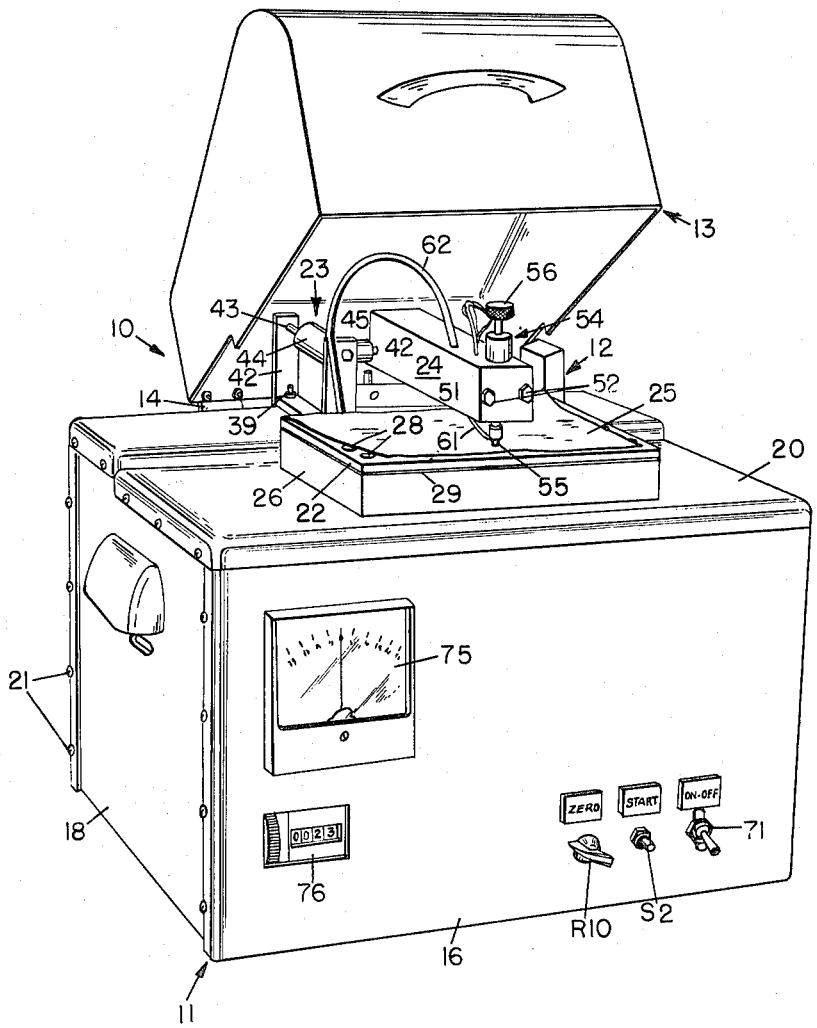
FIGURE 1 is a perspective view of a preferred embodiment of the invention.
Figure 2:
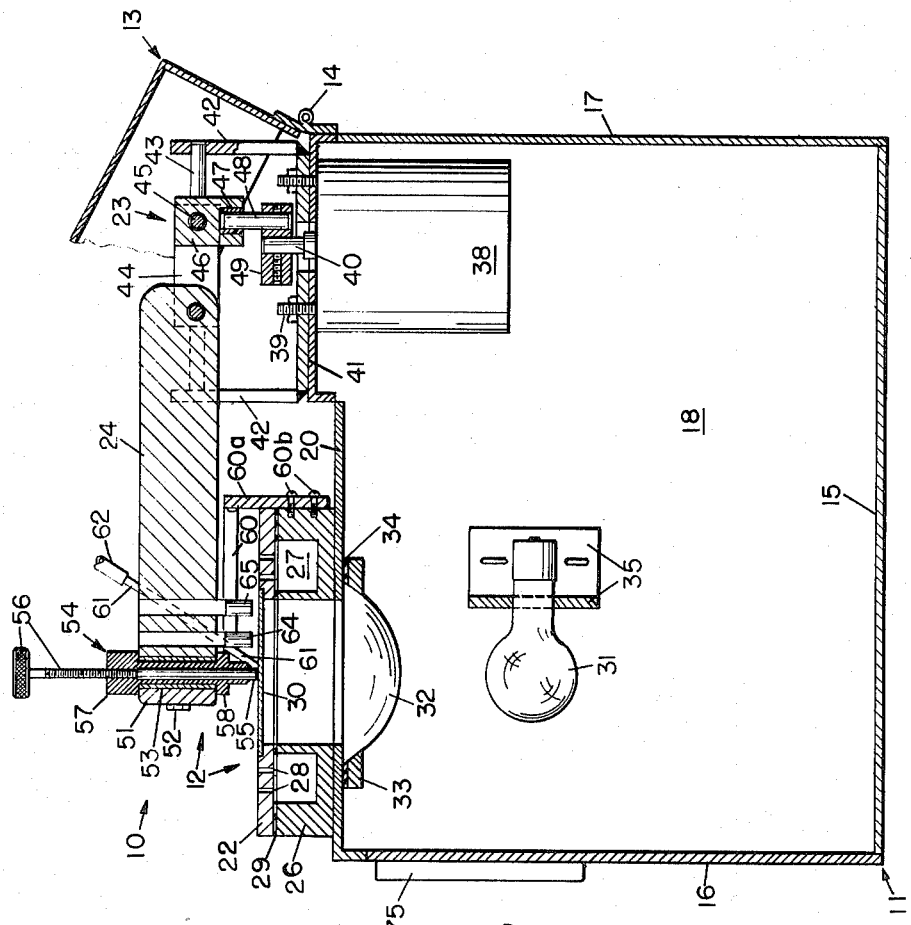
FIGURE 2 is a side elevational view of the apparatus of FIGURE 1, in section, taken on line 2—2 of FIGURE 3.

With reference to the drawings, the numeral 10 generally designates the tester as a whole, which comprises a cabinet 11, a superstructure 12 and an upwardly and rearwardly swingable hood-type cover 13 connected to the upper rear edge of the cabinet by hinges 14.

Cabinet 11 comprises a bottom panel 15, a front panel 16, a rear panel 17, end panels 18 and 19 and a stepped top panel 20. Panels 15–20 may be conveniently formed of die cut and shaped sheet metal and certain of said panels may have marginal flanges adapted to overlap the margins of adjacent panels and fixed thereto as by self tapping screws 21.

Superstructure 12 includes most of the basic mechanical elements of the tester and comprises a paper holding stationary platen 22, a reciprocating carriage 23 and a longitudinally reciprocating upwardly swingable tester arm 24 coupled to the carriage and oscillated thereby to effect the erasing, abrading, of the test sheet of paper 25, FIGURE 1.

Platen 22 is supported on the lower forward step of top panel 20 by a rectangular frame 26 of cast metal, molded plastic or other suitable material. Frame 26 has a continuous open topped channel 27 formed therein. Channel 27 is connected to a source of vacuum by any conventional means, not shown, for the purpose of vacuum holding of a test sheet of paper firmly and flat against platen 22. The vacuum acts through a series of apertures 28 in the margin of the platen and registering with channel 27. A sealing gasket 29 of resilient material seals the platen covered channel 27 against marginal leakage.

Platen 22 has a large central opening registering with the open center of frame 26 to constitute a light window in said parts. The opening in the platen has a rabbeted upper margin forming a seat for receiving and holding a plate 30 of frosted or milky light-diffusing glass with its top surface flush with the top surface of platen 22.

A lamp 31 of the concentrated filament or "point source" type is located coaxially below the window in parts 22 and 26 and with its filament at the focus of a lens 32. Lens 32 closes the bottom of the window by being fixed under a registering opening in the top cabinet panel 20 by a beveled ring 33. Ring 33 and its cooperating resilient gasket 34 are fixed to the under surface of panel 20 by any conventional fastening means, not shown. Lens 32 provides a uniform beam of parallel light rays which together with the diffusing plate 30 insure even illumination of the portion of test sheet 25 overlying the window. Lamp 31 is supported by a bracket 35 fixed at its ends to end panels 18 and 19 of cabinet 11, as by conventional angle brackets 36 welded to the joined parts. A reflector shaped, black surfaced light absorber 37 may be attached to bracket 35 below lamp 31 to minimize the amount of non-focused light entering the window.

A synchronous motor 38 is mounted on the under surface of top panel 30 by screws 39 so that its drive shaft 40 extends upwardly through aligned concentric openings in the panel and in a rectangular plate 41 which is also attached to panel 20 by screws 39. Plate 41 constitutes the base of a stationary guide and support for a reciprocating carriage for the test arm 24.

Base plate 41 has welded to each corner thereof an upright flat bar 42. Four bars 42 constitute supporting posts for a pair of parallel horizontally disposed guide rods 43, the ends of which are held in aligned holes in the upper ends of bars 42. A pair of ball bushing type sleeves 44 are mounted one on each guide rod 43 for low friction and low play movement therealong. The rear ends of sleeves 44 are rigidly interconnected by a transverse rod 45 on which a block 46 is slidably mounted.

Block 46 has a downwardly opening bore lined with a bearing bushing 47 in which a vertical shaft 48 is journaled. Shaft 48 is fixed eccentrically to a disc 49 mounted on drive shaft 40 of motor 38, thus serving as a driven crank to impart a rotary motion to block 46. It should here be observed that motor 38 includes conventional speed-reducing gearing, not shown, between its armature and drive shaft 40 to provide a shaft speed of about two revolutions per second so that the test arm is oscillated at a rate approximating an average manual erasing operation.

The rotary motion of block 46 imparts rectilinear fore and aft oscillatory motion to sleeves 44, between which the rear end of test arm 24 is vertically swingably mounted on trunnion-like coaxial posts 50. Posts 50 are fixed to the front ends of sleeves 44 and are journaled in a bushing lined transverse bore in the rear end of arm 24.

The front end of test arm 24 is capped by an end block 51 attached thereto by screws 52. The arm end and the block 51 have a pair of mating vertical axis semicylindrical recesses in their abutting faces which serve as a holder for a bearing sleeve 53 surrounding the shank of a spool-shaped eraser holder 54. Holder 54 is axially bored to snugly receive therein a rod shaped eraser 55. The eraser is vertically adjustable in the holder bore by a thumb screw 56 threadedly engaged in the tapped upper portion of the bore.

The enlarged portions 57 and 58 of the spool-shaped eraser holder 54 serve as thrust bearings for the holder by engaging the ends of bearing sleeve 53. The lower enlarged portion 58 is provided with evenly spaced teeth 59, FIGURE 3A, to serve as a ratchet wheel engageable by a spring finger 60 at the end of each return stroke of the test arm to rotate the eraser an eighth of a turn for each erasing cycle. This produces even wearing away of the eraser, prevents "skinning over" by making the eraser self-cleaning, prevents accumulation of debris forwardly and rearwardly of the eraser, and facilitates removal of the debris by a vacuum line 61 which is mounted on test arm 24 and terminates adjacent the test area. A flexible hose 62 connects the upper end of rigid line 61 to a source of vacuum.

Figure 3:
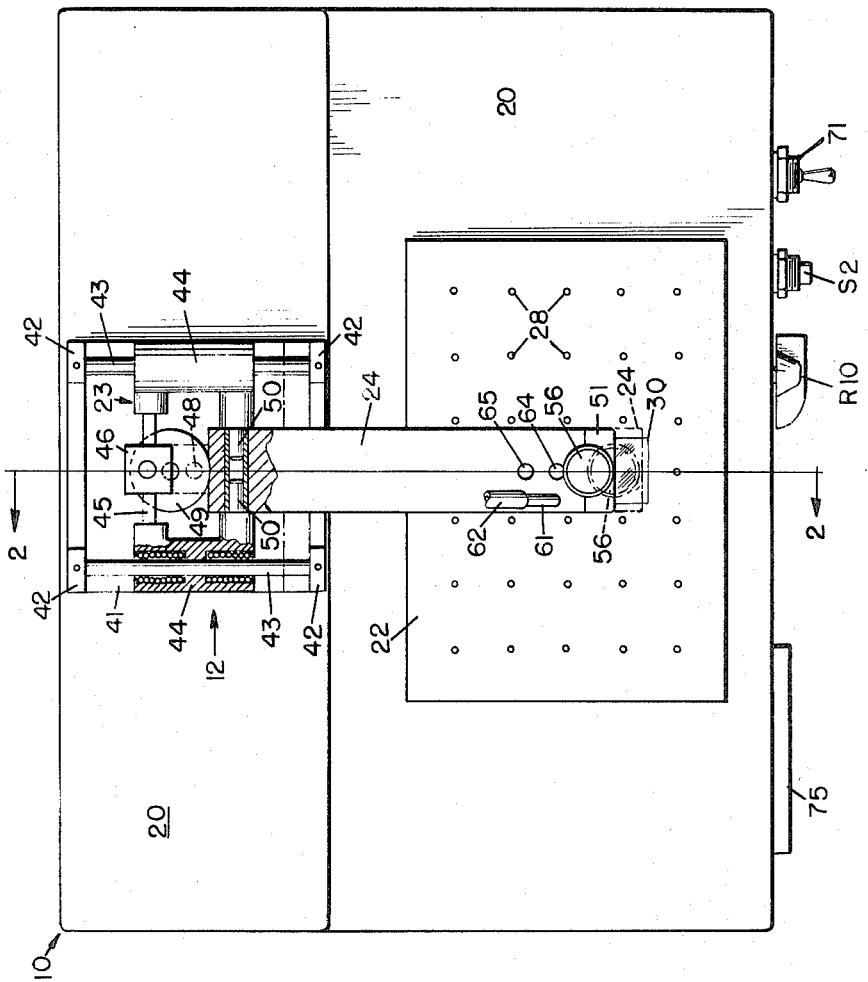
FIGURE 3 is a plan view, partly broken away, of the disclosure of FIGURE 1 with the cover hood removed.
Figure 3A:
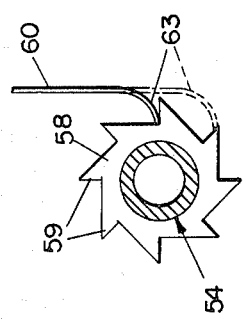
FIGURE 3A is a bottom plan view of the ratchet mechanism for rotating the eraser holder.
Figure 4:
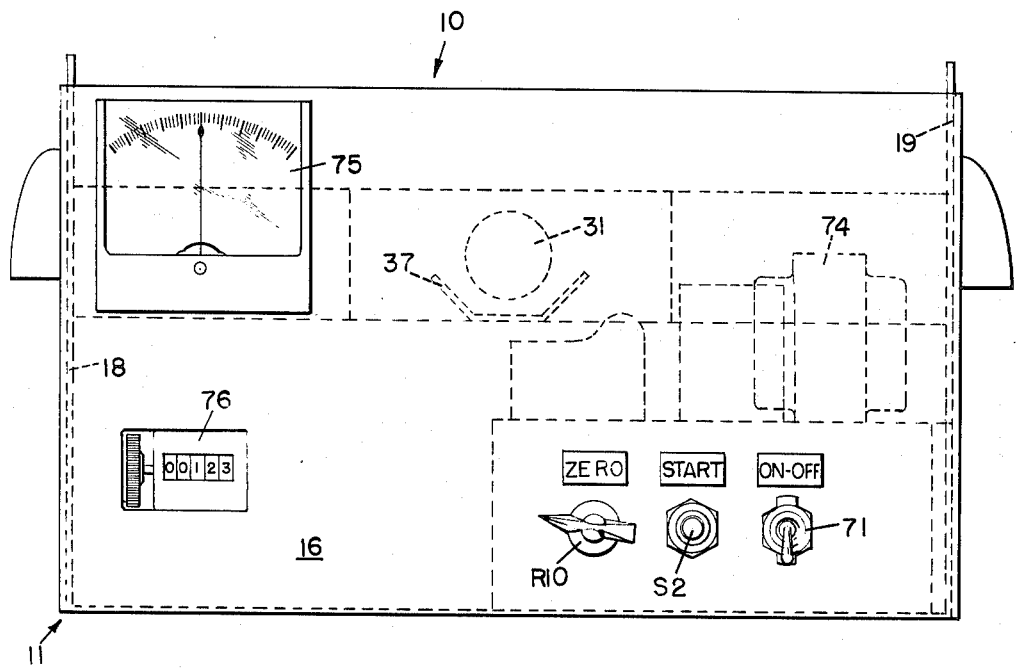
FIGURE 4 is an enlarged front elevational view of the apparatus with its top panel and structure supported thereon removed.

The front end of spring finger 60 is curved at 63, FIGURE 3A, so as not to be displaced by an underlying tooth during each rotating stroke and so as to permit said finger to cam past the underlying tooth at the beginning of each forward stroke of arm 24.

The means for sensing the degree of wearing away of the test area comprises a first photosensitive resistor 64 mounted under and on arm 24 behind and close to eraser 55 and close to the test piece of paper so as to be moved over the test area with each stroke of arm 24. A second similar photosensitive resistor 65 is also attached to the arm so as, at all times, to be close to and exposed to the illuminated area of the test sheet but also so as not to be moved over the test area being abraded. Resistor 65 thus serves as a control which is balanced against detector 64 to compensate for variations in thicknesses of the test paper samples, stray illumination and other variables in the test operations.

Figure 8:
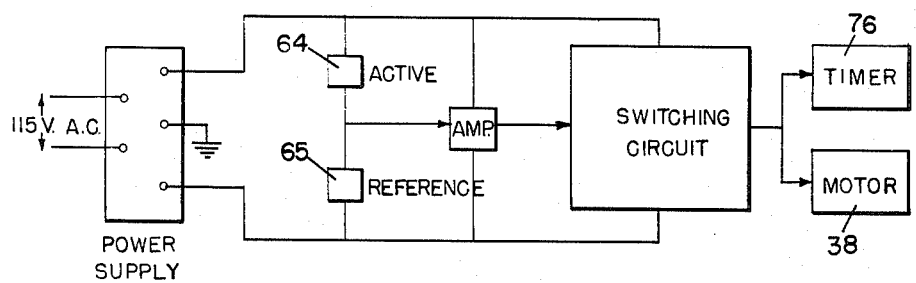
FIGURE 8 is a block diagram of the combined circuits of FIGURES 6 and 7.
Figure 9:
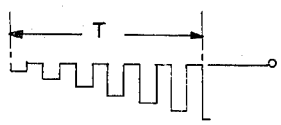
FIGURE 9 is a graph illustrating the pulsating and progressively increasing signal pattern produced by the circuit of the active photodetector.

The functional interrelations between the units of the control system are illustrated by the block diagram of FIGURE 8. The photo electric detector 64 for intermittently sensing the abraded area is labeled ACTIVE while control detector 65 is labeled REFERENCE. The initially balanced and progressively unbalanced signals from the two detectors are fed to an amplifier, AMP. The amplified composite signal is fed to the SWITCHING CIRCUIT which, in turn, when triggered, stops the TIMER and the MOTOR. FIGURE 9 graphically illustrates the progressively increased strength of the signal pulses generated as detector 65 moves over and away from the erased test area.

With reference to FIGURE 6, a pair of terminals 66 and 67 connect conductors 68 and 69 through a fuse 70 and a manual master switch 71 to a pair of conductors 72 and 73 and to the primary winding of a step up power transformer 74. The center tapped secondary winding of the transformer 74 is connected, as shown, to two half-wave rectifier circuits, each including a rectifier D1 or D2 and a filter network. The output of a pi-type filter network R1, C1 and C3 is a positive voltage, while the output of a network R2, C2 and C4 is a negative voltage when referred to the center tap of transformer 74 or chassis ground.

A zener diode D3 in conjuction with a resistor R3 form a regulating circuit having an output of plus 18.5 v. D.C. A diode D4 and a resistor R4 provide an identical circuit for the equal voltage negative supply.

The two photosensitive resistors 64 and 65 are connected in series between the positive and negative supply leads. The output from these detectors is taken from their common junction, and is approximately zero when both elements are subjected to the same light level. When either element is subjected to a change in light intensity, the junction shifts from zero thereby creating an output. If the photodetectors are not matched, a compensating resistor R5 may be used to match them.

An amplifier transistor Q1 has its base connected to the output junction of the detector circuit. The emitter of the transistor Q1 is connected through a negative feedback resistor R7 to a 2.0 v. reference generated by a zener diode D5. The base signal is amplified by the transistor Q1 and noise and drift are reduced by a feedback resistor R6.

A resistor R8 is the load resistor for transistor Q1. The amplified signal is fed through a voltage dividing network, comprising resistors R9 and R11 and a potentiometer R10, which is a zero control of the circuit. The signal is developed from the adjustable center tap of the potentiometer R10 to ground across another potentiometer R12, which is the sensitivity control of the circuit.

When the signal voltage on the wiper arm of the sensitivity control R12 becomes sufficiently negative, it overcomes the positive bias applied to the base of a transistor switch Q2 causing it to conduct. Such positive bias is developed by resistors R14, R15 and R16 and normally maintains transistor switch Q2 in non-conducting condition.

A relay X2 is energized when transistor switch Q2 conducts. A microammeter 75 is used to make the zero adjustable at the beginning of a test, and is removed from the circuit by contacts 1-A of a relay X1 at the time the motor 38 starts.

The switching sequence is as follows: After the erasing arm 24 is lowered to bring eraser 55 into contact with the sheet of paper 25, the circuit is zeroed by control R10 and then start switch S2, FIGURE 7, is manually closed. When switch S2 closes, 110 v. A.C. are supplied to motor 38, to relay X1 and to timer 76, which timer is desirably constructed to give a digital reading in seconds and tenths of seconds. Relay X2 is at this time de-energized and contacts 2-A are closed. Contacts 1-B of relay X1 close when relay X1 is energized. The energizing of relay X2 opens the 110 v. A.C. circuit to relay X1, timer 76 and motor 38, thereby ending the test.

In FIGURE 5, numeral 77 designates a voltage reducing transformer for lamp 31 while numeral 78 indicates a capacitor for the motor 38.

For most papers, the test can be conducted without any typewritten characters thereon. Tests usually require from 1 to 200 seconds, and average about 20 to 30 seconds. Paper should be conditioned at a selected humidity, for example 50%, for at least 10 minutes. The eraser should protrude about $\frac{1}{16}$ inch from its holder.

For testing special surface sized and supercalendered sheets, such as "Gilbert Superase," which do not allow ink to penetrate the fiber layers, the tested specimen should be covered with typed characters, for example, asterisks, or a solid printed field.

While but one form of the invention has been shown and described, it will be readily apparent to those skilled in the art that many minor modifications and equivalent structures may be made without departing from the present invention or the scope of the appended claims.

What is claimed is:

1. An erasability tester comprising: means for holding and firmly backing a sheet of test paper, means for holding an eraser in constant pressure contact with a test area of said paper, means including a motor for moving said eraser holding means with a constant rate of abrading movement over said test area, means for projecting a light beam of constant cross sectional intensity through said test area and adjacent areas of said paper, a first photosensitive means connected to and movable with said eraser holding means so as to continually sense the increase in light transmissivity of said test area as the paper therein is worn away by said eraser, a second photosensitive means poistioned to continually sense the light transmissivity of the paper in an area adjacent to said test area, a timer for measuring the duration of a test run, and an electronic circuit connected to said photosensitive means and including a relay controlling the operation of said timer, said circuit being adjustable to vary the responsiveness thereof to signal strength from said photosensitive means, whereby said timer is stopped to indicate the time required to produce a predetermined increase in the light transmissivity of the paper in said test area.

2. Structure according to claim 1, said eraser holding means including means for continually rotating the eraser during a test run to provide even wearing away of said eraser, to make the erasing surface of said eraser self-cleaning to prevent skinning over thereof, and to prevent accumulation of debris in front of and behind said eraser.

3. Structure according to claim 1, said eraser holding means comprising a horizontally disposed arm pivotally connected at one end thereof to said moving means for vertical swingiing of said arm, a vertically bored holder for said eraser fixed to the other end of said arm, said eraser being of rod shape and vertically adjustably held in said bore, said arm pressing said eraser against said test area by the wegiht of said arm, and said moving means being constructed to impart longitudinal oscillatory motion of said arm.

4. Structure according to claim 1, said photosensitive means being connected in initially balanced relatively adjustable circuit portions which provide a zero output signal when balanced, and a temporarily connectable circuit for testing and indicating the balance or imbalance of said circuit portions whereby initial perfect balance may be obtained at the start of each test run.

5. An erasability tester comprising: means for holding and firmly backing a sheet of test paper, means for holding an eraser in constant pressure contact with a test area of said paper, means including a motor for moving said eraser holding means with a constant rate of abrading movement over said test area, means for projecting a light beam of constant cross sectional intensity through said test area and adjacent areas of said paper, a photosensitive means connected to and movable with said eraser holding means so as to continually sense the increase in light transmissivity of said test area as the paper therein is worn away by said eraser, a timer for measuring the duration of a test run, and an electronic circuit connected to said photosensitive means and including a relay controlling the operation of said timer, said circuit being adjustable to vary the responsiveness thereof to signal strength from said photosensitive means, whereby said timer is stopped to indicate the time required to produce a predetermined increase in the light transmissivity of the paper in said test area.

6. Structure according to claim 5, said eraser holding means including means for continually rotating the eraser during a test run to provide even wearing away of said eraser, to make the erasing surface of said eraser self-cleaning to prevent skinning over thereof, and to prevent accumulation of debris in front and behind said eraser.

7. A tester as defined in claim 5 wherein said paper holding means comprises a platen a portion of which is translucent, and wherein a lens is positioned immediately below said translucent portion, and wherein a point light source is positioned below said lens, said lens converting the rays from said light source to parallel vertically ascending rays.

8. Structure according to claim 5, said eraser holding means comprising a horizontally disposed arm pivotally connected at one end thereof to said moving means for vertically swinging of said arm, a vertically bored holder for said eraser fixed to the other end of said arm, said eraser being of rod shape and vertically adjustably held in said bore, said arm pressing said eraser against said test area by the weight of said arm, said moving means being constructed to impart longitudinal oscillatory motion to said arm, said vertically bored eraser holder having a ratchet wheel coaxially positioned on one end thereof, and a spring finger fixed to said tester and positioned to engage said ratchet wheel at the end of each stroke cycle of said arm to rotate said holder and thereby said eraser for providing even wear and self-cleaning of said eraser.

References Cited by the Examiner

UNITED STATES PATENTS

| | | | |
|---|---|---|---|
| 2,517,330 | 8/50 | Marenholtz | 88—14 |
| 2,721,473 | 10/55 | Allen et al. | 73—7 |
| 2,734,375 | 2/56 | Galbraith et al. | 73—7 |
| 2,895,326 | 7/59 | Fesperman et al. | 73—7 |
| 3,063,285 | 11/62 | Jensen et al. | 73—7 |
| 3,065,615 | 11/62 | Abrams | 88—14 |
| 3,100,981 | 8/63 | Engle et al. | 73—7 |

RICHARD C. QUEISSER, *Primary Examiner.*

DAVID SCHONBERG, *Examiner.*